July 7, 1959
C. E. RICKARD
2,893,437
PROTECTOR NIPPLE
Filed Nov. 13, 1957
2 Sheets-Sheet 1
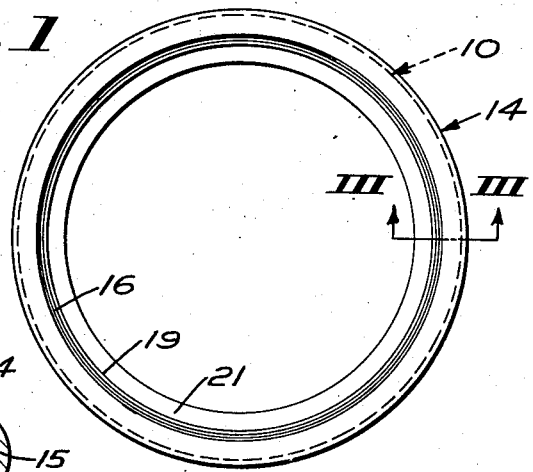
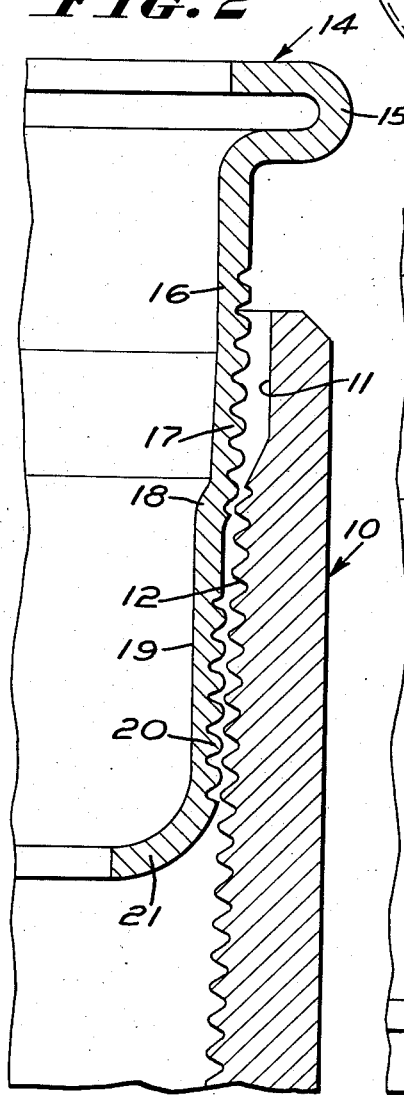
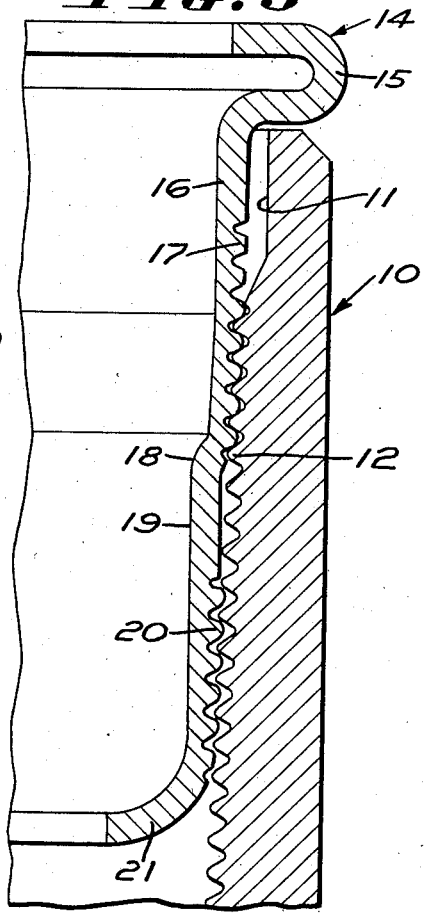

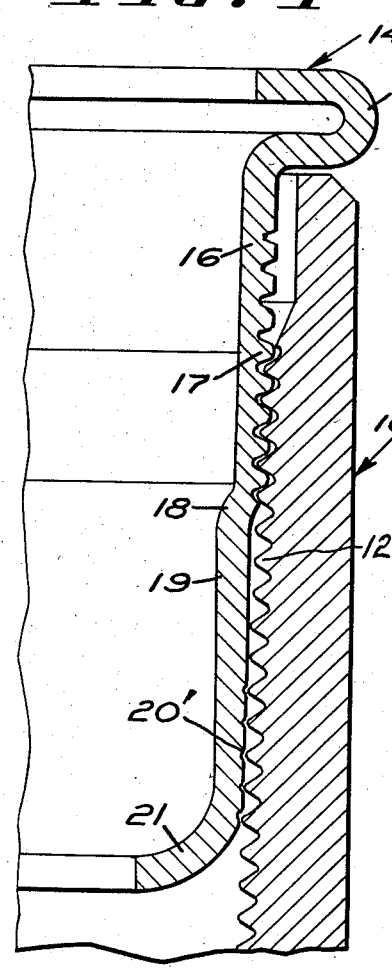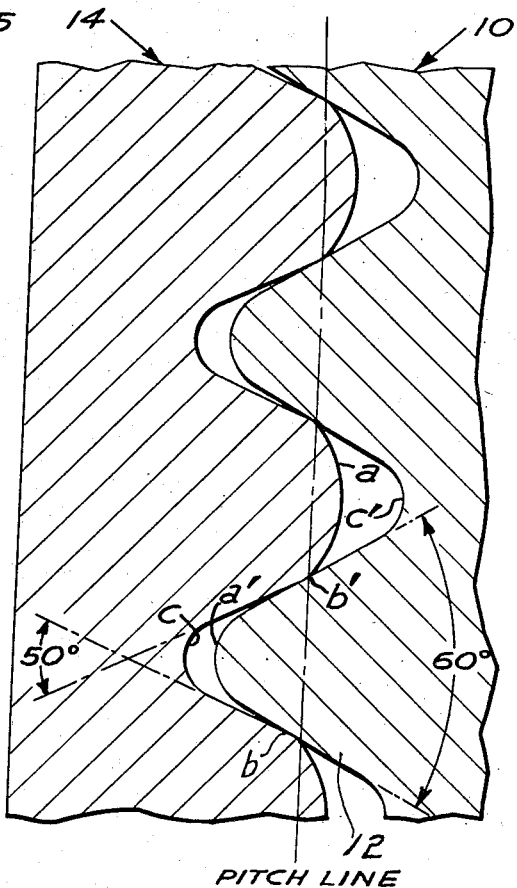

United States Patent Office 2,893,437
Patented July 7, 1959

2,893,437
PROTECTOR NIPPLE

Clyde E. Rickard, Pittsburgh, Pa., assignor to McDowell Manufacturing Company, Millvale, Pa., a corporation of Pennsylvania Application November 13, 1957, Serial No. 696,259

10 Claims. (Cl. 138—96)

This invention relates to thread protectors and particularly to a nipple type.

In this particular art, protectors are employed to protect the threaded end portions of pipe and casing members during handling and shipping. In this connection, great care must be taken to avoid distorting or damaging such end portions and particularly, the threads thereof, as otherwise difficulty will be encountered in assembling the members and in obtaining a secure and fluid-tight joint.

There has been a need in the art for a better type of protector which can be quickly and easily mounted and dismounted and which will give maximum protection to casing or pipe end portions, such as tapered threaded portions used in petroleum and other fluid conduit systems. I have been able to develop a protector which quickly and easily attains a securely mounted relationship and is guided at all times into and out of such relationship and while positioned in such a relationship.

It has thus been an object of my invention to devise a new and improved form of thread protector for the threaded end portions of pipe, casing and conduit members and particularly, for internally threaded members;

Another object has been to devise a nipple type of thread protector which has a forward guide and alignment portion and a back securing portion;

A further object of my invention has been to devise a thread protector nipple having guide and securing portions which will cooperate with each other to hold the nipple in position with respect to the casing and in such a manner as to prevent damage to threaded portions thereof, and even if some relative pivotal movement is imparted between the nipple and the casing;

A still further object of my invention has been to provide a protector nipple that provides pitch line or cone contact with threads of the casing, as distinguished from root and crest contact, and in such a manner as to protect the threads of the casing under various strain, stress and jarring conditions;

These and other objects will appear to those skilled in the art from the drawings and from the description of exemplary embodiments.

In the drawings,

Figure 1 is a top plan view of a thread protector constructed in accordance with my invention, and in an assembled position with the end portion of a threaded casing that is to be protected;

Figure 2 is an enlarged fragmental section in elevation through the assembly of Figure 1 showing the protector in a preliminary or initial position with respect to the threaded casing;

Figure 3 is a view similar to and on the same scale as Figure 2, but showing the protector in a fully on or assembled relationship with respect to the casing; it will be noted that this figure is taken along the line III—III of Figure 1;

Figure 4 is a view on the same scale as and similar to Figure 3, but showing a modified type of protector, and particularly emphasizing the importance of a novel feature of the construction of Figures 2 and 3; and Figure 5 is a greatly enlarged vertical fragment illustrating an important principle or feature of the cooperating relationship of the threads of my form of protector with respect to the threads of the casing or pipe member.

As shown in Figures 2 and 3, I have provided a thread protector 14 of a so-called nipple, insertable or inner sleeve type which has three primary parts or portions 15, 16, and 19. Actual aligning, mounting and securing functions are attained by a front or forward, substantially cylindrical wall guide portion 19 and a rear or back, substantially cylindrical mounting and securing wall portion 16. The casing or pipe end 10 that is to be protected is shown provided with an outwardly-offset cylindrical outer end portion 11, and an internally-threaded end portion 12 whose threads may be of any standard or desired pitch or diameter. As particularly shown in Figures 2, 3 and 4, the internally-threaded end portion may be provided with a slight taper.

In employing my form of protector 14, I first (see particularly Figure 2) insert its rounded or turned-in forward nose portion 21 past the portion 11 of the casing and move or slide its forward threads 20 in an advancing relationship along the opposed threads 12 of the casing, until a forward portion of back threads 17 preliminarily engage or mesh with the ends of the threads 12 of the casing. Then, I start to turn or provide relative movement of the protector 14 with respect to the casing 10 until the threads 17 of the back wall portion 16 have been turned-on or advanced to the securely-mounted final position of Figure 3. At this time, a flexible, bent-over, back flange or rim wall portion 15 is in close adjacency with the forward edge of the casing 10. It will be noted that the walls of the portion 15 are in an opposed and spaced relationship with each other and preferably, are in slightly spaced relationship (see Figure 3) with respect to the edge of the casing 10.

The flange wall portion 15 serves as a manual turning or grip portion for the protector 14 and radially projects outwardly to clear the outer diameter of the casing 10 and preferably, to extend slightly beyond the full thickness of the edge of the casing 10 to give it maximum protection. Any bump or jar during handling, stacking, etc., of the casing 10 is, as far as its end is concerned, taken up in a resilient manner by the turned-over, spaced, dual-wall construction of the flange or rim wall portion 15 of the protector. If a pivotal action is imparted by such a jar, then the internal or female threads 12 of the casing 10 are protected as to their crests and roots, although as illustrated somewhat diagrammatically in Figure 5, contact may be made not only, as normally, with respect to the male threads 17 of the back mounting or securing wall portion 16, but also with respect to the guide threads 20 of the front guide wall portion 19 of the protector. This contact is essentially one between or along a pitch line or pitch cone of the threads 12.

Referring particularly to Figure 5, it will be seen that the crests $a'$ as well as the roots $c'$ of the threads 12 cannot be damaged, broken-off or distorted, since they are always in a spaced relation with the threads of the connector, and the only contact is along the flanks or sides $b'$ of the threads and particularly, along a pitch line or cone of the threads 12. In Figure 5, I have indicated the crest portions of the threads of the protector 14 by $a$, the side or flank portions by $b$ and the root portions by $c$.

As seen particularly from Figure 3, there is a spacing provided between the pitch line of the threads 12 and the pitch line of the threads 20 at the front or guide wall or portion 19. Preferably, this spacing should be about .025 inch on a side which gives an overall spacing of about .050 of an inch on the diameter. This provides clearance for the front threads 20 and allows the back threads 17 to contact the end of the threads of the casing member 10. Also, as shown in this figure, the threads 17 tend to align on the threads 12 to provide a secure guided positioning for the protector when it is in its fully-advanced, mounted or secured relationship on or within the casing member 10.

The front wall portion 19 is shown connected by a radially-offset or step shoulder portion 18 to the back wall portion 16, so that the threads 20 of the front wall portion 19 have a slightly less outer diameter than the threads 17 of the back wall portion 16. Thus, when the protector 14 is being inserted, its first half or portion of insertion may be a sliding type, by reason of a slight slide-in clearance between the crest portions of the threads 12 and the corresponding crest portions of the threads 20. However, when the protector is being fully mounted as shown in Figures 2 and 3, the relationship tends to change slightly, due to the taper of the threads 12, so that the threads 12 and 20 rather loosely align in a loosely threaded or intermeshing relationship with each other (see Figure 3) as the threads 20 advance on the taper to further the guided and securely mounted relationship of this position.

Since the threaded diameter of the front wall portion 19 serves as a guide for alignment, thread starting is made easy and improved. However, the effort and relative movement required to securely mount the protector 14 is limited to the threads 17 of the back portion 16. Thus, a minimum number of turns are required to provide a full-thread-depth contact and holding action as to the back threads 17. That is, with offset threads, less turns are required to attain full thread depth contact of the back threads 17. The front threads 20 are so shaped that, if bumped, over the casing threads 12, the contact, as previously mentioned, is on or along a pitch cone of both threads 12 and 17 to prevent damage to the crests of the threads. Since, as shown, the threads of front and back portions of the protector are of the same pitch, a good condition is provided should the protector tip or pivot against the starting threads 20.

In making the protector 14, I prefer to employ an open-end metal shell of steel or other suitable material which is drawn and rolled to provide it with offset shoulders or corrugations that not only strengthen it, but provide for thread run-out.

Briefly summarized, in the construction of Figures 1 to 3, inclusive, the protector 14 has a hollow or substantially cylindrical body that is provided with an in-turned or rounded forward or front guide nose portion 21, a connecting front guide wall portion 19 of substantially cylindrical shape, a connecting back mounting wall portion 16 of larger diameter and also of substantially cylindrical shape, and a back flange and turn-on limit stop portion 15 of dual-wall, resilient construction. The clearance slide-on of the guide wall portion 19 is assured by its radially-offset relation with the back wall portion 16 and with the threads of the casing member 10.

As shown in Figure 5, the taper or slope of the flanks b of the threads of the guide wall portion 19 provides an angle of about 25° with respect to a perpendicular through the roots of such threads or a 50° slope angle between opposing flanks which is about 10° (5° on each side) less than the 60° slope angle of corresponding flanks b' of the threads 12 of the casing member 10. In any event, as illustrated in Figure 5, the threads 17 of the back wall portion 16 and the threads 20 of the front wall portion 19 only engage or abut at their flanks and only with the flanks of the threads 12 of the casing member 10. As a result, frictional turning-on effort is minimized as to the secure engagement of the threads 17 of the mounting wall portion 16, and only flank-guide contact is provided between the threads 20 of the guide wall portion 19 and the threads 12 of the casing member. This assures that the crests a' and valleys c' of the threads 12 will be protected at all times.

In Figure 4, I have indicated a slightly modified type of protector 14' and employ the same numerals as used in the embodiments of Figures 2 and 3 for portions of the same type of construction. The difference in this construction is the fact that the forward wall portion 19 is not threaded but may have, as shown, thread outlines 20' in the guide wall portion. This construction provides the quick and easy, on and off mounting of the protector 14 of Figures 2 and 3, but does not give the protection to the crests of the threads 12 if pivot action occurs between the protector and the casing member. This embodiment thus emphasizes an important feature of the construction of Figures 1 to 3, inclusive.

What I claim is:

1. A protector for a tapered threaded end portion of a casing member which comprises, a substantially cylindrical body having a front guide wall portion and a back mounting wall portion, said back wall portion having threads to engage with the threads of the end portion of the member solely on and immediately adjacent to a common pitch cone therealong, said front wall portion having a radially-offset relation with respect to said back wall portion and with respect to the threads of the end portion of the casing member to guide said body over and along the end portion until the threads of said back portion engage the threads of the end portion wherein said front wall portion then loosely aligns with opposed threads of the casing member, and a protective radially-projecting flange on the back end portion of said body to extend across the wall thickness of the end of the casing member and provide a grip portion for turning said body and the threads of said back wall portion into and out of a securely mounted position on the threads of the threaded end portion of the casing member.

2. A protector as defined in claim 1 wherein only portions of the flanks of the threads of said back portion engage portions of the flanks of the threads of the end portion of the casing member.

3. A protector as defined in claim 1 wherein said front wall portion has guide threads that have a clearance with the threads of the end portion of the casing member when said body is being moved on the end portion and before the threads of said back portion have been screw-engaged with the threads of the end portion, and said guide threads loosely align with threads of the end portion of the casing member to further guide and securely mount the protector as it is advanced along the taper.

4. A protector for a tapered threaded end portion of a casing member which is to be guided into a threaded relationship about the threaded end portion of the casing member which comprises, a hollow body having a rounded nose portion, a front wall portion projecting backwardly from said nose portion, a back mounting wall portion connected to said front wall portion and having a radially-outwardly-offset relation therewith, a back flange portion connected to said back wall portion and projecting radially-outwardly with respect thereto to protect an end wall of the casing member on which said body is to be mounted; said back wall portion having threads to engage solely with the flanks of threads of the casing member along a common pitch cone and to move therealong when said housing body is turned with respect to a casing member to securely mount said body on the casing member, and said front wall portion being provided with a threaded portion having its pitch cone offset with respect to the pitch cone of the threads of the back wall portion to relatively loosely move over the threads of the threaded end portion of the casing member until the threads of said back wall portion engage the threads of the casing member.

5. A protector for mounting in a secure relationship on the threads of a threaded end portion of a tapered casing member which comprises, a hollow body having a front guide wall portion, a connecting back mounting wall portion, and a substantially cylindrical radially-projecting back flange portion; said back wall portion having threads therealong to engage with and screw on the threads of the casing member solely along their respective flanks, said front wall portion having a threaded portion which is radially-inwardly-offset with respect to said back wall portion for an initial closely adjacent slide-guiding relationship with respect to the threads of the casing member, and said back flange portion projecting radially-across the end wall thickness of the casing member to protect it and provide a grip portion for screwing said body and the threads of said back wall portion into and out of a secure mounted position with respect to the casing member.

6. A protector as defined in claim 5 wherein, the radially-inwardly-offset threads of said front wall portion have a pitch cone offset with respect to the pitch cone of the threads of the casing member, whereby the offset threads cooperatively loosely intermeshingly align with the threads of the casing member as the protector is advanced on the taper, and the threads of said back wall portion are in engagement with the threads of said casing member.

7. A protector as defined in claim 5 wherein the pitch cone of the threads of said front wall portion is radially-offset with respect to the pitch cone of the threads of said back wall portion to provide a slide-on assembly of the front wall portion adjacent the threads of the casing member until the threads of said back wall portion engage the threaded end portion of said casing member.

8. A protector as defined in claim 7 wherein the flanks of the threads of said back wall portion have a smaller slope angle with respect to a line perpendicular to such threads than the flanks of the threads of the casing member have with respect to a line perpendicular thereto, so that the threads of the casing member, when moved into a cooperative relationship with the threads of said back wall portion, will only engage along their flanks with flanks of the threads of said back wall portion and crests and roots of the threads of said back wall portion will be in a spaced relationship with the crests and roots of the threads of the casing member.

9. A protector to be mounted within and about inner threads of a threaded tapered end portion of a casing member which comprises, a substantially cylindrical body having a front guide wall portion and a back mounting wall portion connected to said front wall portion in a radially-outwardly offset relationship with respect thereto, said back wall portion having male threads to mesh with the inner threads of the casing member after the front wall portion has been moved over and along the casing member, a back flange portion projecting radially-outwardly of said back wall portion to provide a grip for turning said body with respect to the casing member and a limit stop for maximum inward movement of said body with respect to the casing member, and said front wall portion having threads therealong whose pitch cone is offset about .050 of an inch on its diameter with respect to the pitch cone of the threads of the casing member to provide the clearance for said front wall portion in mounting said body on the casing member.

10. A protector to be mounted within and about inner threads of a threaded tapered end portion of a casing member which comprises, a substantially cylindrical body having a front guide wall portion and a back mounting wall portion connected to said front wall portion in a radially-outwardly offset relationship with respect thereto, said back wall portion having male threads to mesh with the inner threads of the casing member after the front wall portion has been moved over and along the casing member, a back flange portion projecting radially-outwardly of said back wall portion to provide a grip for turning said body with respect to the casing member and a limit stop for maximum inward movement of said body with respect to the casing member, said front wall portion having threads therealong in a radially-inwardly offset relationship with respect to the threads of said back wall portion, the pitch cone of said front wall threads being offset about .025 inch on a side from the pitch cone of the threads of said casing member when the protector is fully mounted, and the threads on said back wall portion then only engaging the threads on said casing member substantially along a common pitch cone through their respective flanks.

References Cited in the file of this patent

UNITED STATES PATENTS

| | | |
|---|---|---|
| 1,675,142 | Shrum | June 26, 1928 |
| 1,675,143 | Shrum | June 26, 1928 |
| 2,156,169 | Unke | Apr. 25, 1939 |
| 2,890,690 | Graham | July 31, 1945 |
| 2,581,690 | Moehle | Jan. 8, 1952 |
| 2,587,544 | Sneddon | Feb. 26, 1952 |
| 2,730,136 | Phillips | Jan. 10, 1956 |